United States Patent [19]

Proudlock et al.

[11] Patent Number: 4,752,629
[45] Date of Patent: Jun. 21, 1988

[54] BINDER FOR ANTI-FOULING PAINTS

[75] Inventors: Kevin Proudlock, Newcastle-Upon-Tyne, United Kingdom; Simon P. J. Dennington, Sarpsborg, Norway

[73] Assignee: International Paint Public Limited Company, United Kingdom

[21] Appl. No.: 858,960

[22] Filed: May 2, 1986

[30] Foreign Application Priority Data

May 14, 1985 [GB] United Kingdom ............... 8512212

[51] Int. Cl.⁴ ...................... C09D 5/14; C08F 220/14; C08F 20/12
[52] U.S. Cl. .................... 523/122; 523/177; 524/175; 524/413; 524/432; 524/558
[58] Field of Search ............... 523/122, 177; 524/432, 524/413, 175, 558

[56] References Cited

U.S. PATENT DOCUMENTS

| 3,004,957 | 10/1961 | Lynn | 526/265 |
|---|---|---|---|
| 4,021,392 | 5/1977 | Milne et al. | 260/28.5 |
| 4,191,579 | 3/1980 | Hails et al. | 106/15 |
| 4,375,495 | 3/1983 | Yuki et al. | 526/326 |
| 4,426,464 | 1/1984 | Sghibartz | 523/122 |
| 4,473,690 | 9/1984 | Yuki et al. | 526/326 |
| 4,532,269 | 7/1985 | Gitlitz et al. | 523/122 |

FOREIGN PATENT DOCUMENTS 49-30102  8/1974 Japan .
2118196 10/1983 United Kingdom .

OTHER PUBLICATIONS

Derwent Abs 84-117842/19 Daicel Chem Ind KK (1984) J59056414.
PCT Application No. PCT/US84/0068, Jan. 17, 1984

"Erodible Ship-Bottom for Control of Marine Fouling".
J. Polymer Sci, Part B, 6(10) pp. 753–755 (1968).
J. Polymer Sci., Polymer Chemistry Edition, 13, pp. 1161–1174, (1975).
Derwent Abstract 74533D/41 of unexamined Japanese Patent Application 56-106907 pub Aug. 25, 1981.

*Primary Examiner*—Herbert J. Lilling
*Attorney, Agent, or Firm*—Steele, Gould & Fried

[57] ABSTRACT

An anti-fouling marine paint comprises a pigment, a marine biocide which may or may not be identical to the pigment and a film-forming binder which is a hydrolysable polymer which contains units of the formula:

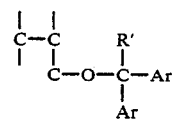

and can be obtained by polymerisation of an alpha-aryl alkyl ester having the formula:

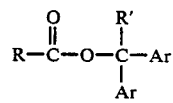

where R is an alpha, beta-unsaturated organic group, each Ar independently is an aryl group and R' is a hydrogen atom or an alkyl or aryl group.

19 Claims, No Drawings

BINDER FOR ANTI-FOULING PAINTS

FIELD OF THE INVENTION

This invention is concerned with anti-fouling marine paints used on surfaces likely to come into contact with aquatic fouling organisms such as algae, seaweed and barnacles, for example on ships or boats, or on the outfalls for cooling water from power stations. More particularly it is concerned with improvements in binders for such paints.

BACKGROUND OF THE INVENTION

The most successful anti-fouling paints in recent years have been self-polishing anti-fouling paints which use binders which are linear polymers containing pendant side groups (hereinafter called "leaving groups") which are liberated from the polymer by reaction with seawater, the residual polymer being sufficiently dispersible or soluble in seawater to be swept away from the paint surface, exposing a fresh lyer of the binder able to undergo a similar reaction with seawater. Such paints are described for example in British Pat. No. 1457590. The gradual thinning of the paint film controls the release of a biocide active against fouling and present either as a pigment in the paint or as a leaving group. The wellknown benefits of such self-polishing paints are that the paint film tends to at least retain its initial smoothness and may even become smoother from the action of relatively moving water and that the biocide contained in the paint tends to be delivered from the surface at a more uniform or constant rate.

The only commercially significant self-polishing paints employ binders which comprise triorganotin ester leaving groups. The triorganotin provides some of the biocidal action of the paints and the triorganotin ester readily undergoes the hydrolysis of which the self-polishing action is dependent. The biocidal activity can be augmented by other anti-fouling substances dispersed or dissolved in the paint film. There may be advantages in replacing some or all of the triorganotin leaving groups by other leaving groups, which are not necessarily biocidal, both for cost reasons and because the powerful biocidal effects of triorganotin may not be desired. There has been concern about the environmental effect of triorganotin biocides released from yachts in particular.

There have been many proposals for a leaving group which substitutes for the triorganotin in forming an easily hydrolysable ester with a polycarboxylic acid polymer, but a commercial self-polishing paint in which the triorganotin moiety has been replaced is still awaited. International Patent Publication No. WO 84/02915 suggests a wide range of organic leaving groups for use in antifouling paint binders but these generally do not hydrolyse quickly enough in the conditions of use, that is in contact with natural water, such as seawater, having a pH of from 8 to 8.4.

SUMMARY OF THE INVENTION

We have found new binders having a rate of hydrolysis suitable for use in anti-fouling paints.

An anti-fouling marine paint according to the invention comprises a pigment, a marine biocide which may or may not be identical to the pigment, and a film-forming binder which is a hydrolysable polymer containing units corresponding to an ester of an olefinically unsaturated acid. The polymer is characterised by a content of units of the formula

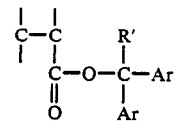

which may be regarded as being derived from an alpha-aryl alkyl ester of the formula

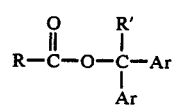

where R is an alpha, beta-unsaturated organic group, each Ar independently is an aryl group and R' is a hydrogen atom or an alkyl or aryl group.

DESCRIPTION OF PREFERRED EMBODIMENTS

Each aryl group Ar is preferably a phenyl or naphthyl group which may be substituted. The two groups Ar may be identical or different. The unsaturated acyloxy group R—COO— is preferably an acrylate or methacrylate group or a maleate or itaconate group, whose second carboxyl group may be esterified with a further group of the formula

The polymer used in the paints of the present invention generates a water-soluble residue by hydrolysis of the aralkyl carboxylate linkage, releasing aralkyl compounds into the seawater. The aralkyl compounds are generally not toxic to marine life and the paints of the present invention therefore contain a separate marine biocide.

Alpha-aryl alkyl ester groups in which not only Ar but also R' is aryl are generally more readily hydrolysed than groups in which R' is hydrogen or alkyl and only Ar is aryl. One or more of the aryl groups can be substituted by one or more (e.g. two) electron-releasing groups, for example alkoxy, acyloxy, aryl or tertiary amino groups. The effect of electron-releasing groups, which are preferably positioned ortho or para to the alkyl substituent, is to increase the rate of hydrolysis of the ester. Where R' is hydrogen or alkyl at least one of the groups Ar is preferably substituted by an electron-releasing group. Where R' is aryl the three aryl groups are preferably unsubstituted or contain in total only one electron-releasing group; they may alternatively be substituted by one or more other groups, for example alkyl, chloro, NH$_2$ or nitro groups.

The class of alpha-aryl alkyl esters therefore provides a wide choice of esters from which polymers for use in this invention may be made, with the opportunity to achieve the desired rate of hydrolysis of the polymer by making homopolymers of those esters having relatively slow rates of hydrolysis or copolymers of those having faster rates.

Specific examples of alpha-aryl alkyl esters of ethylenically unsaturated acids are triphenylmethyl acrylate or methacrylate (i.e. R is $CH_2=CH$ or $CH_2=C(CH_3)$, R' and Ar are all phenyl), diphenyl (p-methoxyphenyl)methyl acrylate or methacrylate (i.e. R is $CH_2=CH$ or $CH_2=C(CH_3)$, R' and one Ar are both phenyl and one Ar is p-methoxyphenyl), tris(p-chlorophenyl)methyl acrylate or methacrylate, phenyl bis(p-methoxyphenyl)methyl acrylate or methacrylate and bis(p--methoxyphenyl)methyl acrylate or methacrylate.

Polymers, particularly copolymers, of a diphenyl (p-methoxyphenyl)methyl ester of the formula:

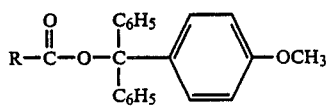

are particularly preferred as binders for the anti-fouling paints of the invention. Such polymers have not previously been described.

Polymers of triphenylmethyl methacrylate are known from the literature as optically active polymers, for example J. Polymer Sci. (Part B 6 (10), 753 (1968) and Polym. Chem. Ed. 13, 1161 (1975) and Japanese published (unexamined) Patent Application No. 56.106907. There has been no suggestion of any use of the polymers as coatings.

The alpha-aryl alkyl esters can generally be prepared by reacting an alpha-aryl alkyl chloride of the formula:

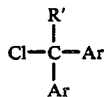

with a metal salt of the unsaturated carboxylic acid RCOOH, for example the potassium or sodium salt, in an organic solvent, for example toluene or xylene. Alternatively, they may be prepared by the process described in European Patent Application No. 134005.

The film-forming polymers can be prepared by addition polymerisation of the alpha-aryl alkyl ester, with or without one or more comonomers, in an organic solvent such as xylene, toluene, butyl acetate, butanol, butoxyethanol or ethoxyethyl acetate at a temperature of 60°-100° C. using a free radical catalyst such as benzoyl peroxide or azobisisobutyronitrile. Some alpha-aryl alkyl esters, for example triaryl methyl esters such as triphenyl methyl methacrylate, do not polymerise as readily as simpler acrylic monomers such as methyl methacrylate, and care should be taken that the triaryl methyl ester and its comonomer truly copolymerise. The polymerisation can be carried out using a controlled monomer feed, with a higher proportion of the triaryl methyl ester being present in the early stages of polymerisation.

The polymers may alternatively be made by reacting the corresponding alpha-aryl alkanol with a preformed polymer of the ethylenically unsaturated acid or its anhydride obtained by addition polymerisation of an appropriate precursor based on the acid moiety of the ester, referred to as an acidic precursor. The polymer/alpha-aryl alkanol reaction is preferred for making maleate ester polymers. The preformed polymer of the precursor can be obtained in a known manner, for example by addition polymerisation of the monomer with or without one or more comonomers at 60–100° C. in an organic solvent using a free radical catalyst in the case of maleic anhydride.

The polymer of the present invention preferably contains at least 20 mole per cent of units corresponding to the alpha-aryl alkyl ester. For reasons explained above, the polymer may be a homopolymer of a slowly hydrolysing species of the ester, so that the polymer preferably contains from 20 to 100 mole per cent of units corresponding to the alpha-aryl alkyl ester. Most preferably it is a copolymer containing 25 to 40 mole per cent of units corresponding to the alpha-aryl ester with at least one ethylenically unsaturated comonomer. The comonomer is copolymerised with the alpha-aryl alkyl ester or the acid or acid anhydride precursor of such an ester. The comonomer is selected to be innocuous to the ester, acid or acid anhydride as appropriate. Such comonomers include, but are not limited to, acrylic esters such as methyl acrylate, methyl methacrylate, ethyl acrylate, butyl acrylate or 2-ethyl hexyl methacrylate, styrene, acrylonitrile, vinyl acetate, vinyl butyrate, vinyl chloride or vinyl pyridine. The polymer may include a minor proportions, preferably less than 25 per cent by weight, of units corresponding to a triorganotin ester of an unsaturated carboxylic acid to provide a paint having a reduced emission of triorganotin groups but having the self-polishing property of known organotin copolymer paints.

Polymers of alpha-aryl alkyl methacrylates, particularly triaryl methyl methacrylate, may be brittle. Copolymers of such methacrylates preferably use a plasticising monomer, for example butyl acrylate, 2-ethylhexyl acrylate or ethyl acrylate, as at least part of the ethylenically unsaturated comonomer content. Polymers of alpha-aryl alkyl acrylates are less brittle.

To form the paint, the hydrolysable polymer binder is mixed with the pigment or pigments used in the paint and with the marine biocide if this is different from the pigment(s). Conventional blending procedures can be used. The pigment generally has a solubility in seawater of below 10 parts per million by weight and is preferably a sparingly soluble pigment having a solubility in seawater of from 0.5 to 10 parts per million, for example cuprous oxide, cuprous thiocyanate, zinc oxide, zinc chromate, zinc ethylene bis(dithiocarbamate), zinc dimethyl dithiocarbamate or zinc diethyl dithiocarbamate. These sparingly soluble copper and zinc compounds are generally marine biocides. These sparingly soluble pigments produce water-soluble metal compounds on reaction with seawater so that the pigment particles do not survive at the paint surface; this aids the smooth dissolution of the paint in relatively moving seawater. Mixtures of sparingly soluble pigments can be used, for example cuprous oxide, cuprous thiocyanate or zinc ethylene bis(dithiocarbamate) which are the most effective biocidal pigments can be mixed with zinc oxide which dissolves slightly more rapidly in seawater and is more effective at inducing the smooth dissolution of the paint.

The paint composition can additionally or alternatively contain a pigment which is not reactive with seawater and may be highly insoluble in seawater (solubility below 0.5 ppm by weight) such as titanium dioxide or ferric oxide. Such highly insoluble pigments are preferably used in proportions up to 40 percent by weight of the total pigment component of the paint, most preferably less than 20 percent by weight.

The proportion of pigment to polymer binder is preferably such as to give a pigment volume concentration which is above 25 percent in the dry paint film but below the critical pigment volume concentration; most preferably the pigment volume concentration is from 35–50 percent.

Paints according to the invention, particularly if based on polymers of an alpha-aryl alkyl methacrylate, may contain a plasticiser, for example tritolyl phosphate, dioctyl phthalate, dibutyl phthalate, tributyl phosphate, butyl benzyl phosphate or dibutyl tartrate.

If it is desired to retard the rate of dissolution of the paint as well as plasticising it, a hydrophobic retarder which also acts as a plasticiser, such as chlorinated paraffin wax, can also be used.

The biocidal effect of the sparingly seawater-soluble pigments, particularly cuprous oxide, cuprous thiocyanate and zinc ethylene bis(dithiocarbamate), may be sufficient so that the paint needs no further biocide. For encountering severe fouling the paint may contain an added biocide. Triorganotin salts and oxides such as triphenyltin fluoride, tributyltin fluoride, tributyltin dibromosuccinate, triphenyltin chloride, triphenyltin hydroxide and tributyltin oxide are effective marine biocides and can be used in paints according to the invention. A paint according to the invention comprising a triorganotin salt (up to 25 percent by volume of the pigments) may have anti-fouling and smoothing properties equal to a triorganotin copolymer paint of much higher triorganotin content. In some cases it will be desired to avoid completely the release of triorganotin ions. Examples of other biocides effective as marine anti-fouling agents are dithiocarbamate derivatives such as cuprous ethylene bis(thiocarbamate) or tetramethyl thiuram disulphide, methylene bis(thiourea), 4-butyl catechol and captan.

The invention is illustrated by the following Examples, in which parts and percentages are by weight unless otherwise stated:

EXAMPLE 1

1 mole triphenylchloromethane was stirred with 1.2 moles potassium methacrylate in 998 g dimethyl formamide in the presence of 0.14 g hydroquinone. The mixture was maintained at room temperature and purged with nitrogen gas. Heterogeneous condensation occurred between the two reactants and solid potassium chloride was precipitated. The potassium chloride was removed by filtration and the triphenylmethyl methacrylate solution produced was concentrated by rotary evaporation at 65° to 100° C. at reduced pressure. The concentrate was left to cool to 20° C. and crystals of triphenylmethyl methacrylate separated out. The product was isolated by filtration, washed with 60/80 petroleum ether and dried at 50° C. at reduced pressure. The yield of triphenylmethyl methacrylate was 85 percent.

55 parts triphenylmethyl methacrylate, 40 parts butyl acrylate and 5 parts methyl methacrylate were dissolved in xylene at a total solids content of 45 percent. 1 part azobisisobutyronitrile was added and polymerisation was carried out for 3 hours at 80° C. followed by 15 minutes at 100° C.

The copolymer solution produced was milled with cuprous oxide at a pigment volume concentration of 35 percent together with a small amount of anti-settling agents to produce a self-smoothing marine anti-fouling paint.

EXAMPLES 2 TO 13

Triphenylmethyl methacrylate prepared as described in Example 1 was copolymerised using the procedure of Example 1 with various proportions of comonomers as set out in Table 1 below. In each case the copolymer solution obtained could be pigmented with cuprous oxide as described in Example 1 to produce an anti-fouling paint.

EXAMPLES 14 TO 17

1 mole triphenylchloromethane was stirred with 1.5 moles potassium acrylate in 998 g dimethyl formamide in the presence of 0.14 g hydroquinone under the conditions described in Example 1. The precipitated potassium chloride was filtered off and the triphenyl methyl acrylate solution was concentrated by rotary evaporation at 65° to 100° C. and reduced to produce liquid triphenylmethyl acrylate. This was dissolved at 70 percent in xylene and filtered.

Copolymers of triphenylmethyl acrylate were prepared using the procedure of Example 1 using the proportions of comonomers set out in Table 2. The copolymer solutions produced could be milled with cuprous oxide as described in Example 1 to produce a marine anti-fouling paint.

TABLE 1

| | Percent By Weight of Each Monomer | | | | | |
|---|---|---|---|---|---|---|
| | Triphenylmethyl Methacrylate | Methyl Methacrylate | Ethyl Acrylate | Butyl Acrylate | 2-Ethylhexyl Acrylate | Tributyltin Methacrylate |
| Example 2 | 60 | — | — | 40 | — | — |
| Example 3 | 50 | 20 | 30 | — | — | — |
| Example 4 | 50 | 20 | 15 | 15 | — | — |
| Example 5 | 45 | 20 | — | 35 | — | — |
| Example 6 | 55 | 10 | — | — | 35 | — |
| Example 7 | 50 | 20 | — | — | 30 | — |
| Example 8 | 55 | 20 | 10 | — | 15 | — |
| Example 9 | 50 | 20 | 20 | — | 10 | — |
| Example 10 | 53 | 15 | — | 30 | — | 2 |
| Example 11 | 49 | 15 | — | 30 | — | 6 |
| Example 12 | 48 | 20 | — | 30 | — | 2 |
| Example 13 | 44 | 20 | — | 30 | — | 6 |

TABLE 2

| | Percent By Weight Of Each Monomer | | |
|---|---|---|---|
| Monomer % Wt ratio | Triphenylmethyl Acrylate | Methyl Methacrylate | Triphenlmethyl Methacrylate |
| Example 14 | 52 | 48 | — |

TABLE 2-continued

| | Percent By Weight Of Each Monomer | | |
|---|---|---|---|
| Monomer % Wt ratio | Triphenylmethyl Acrylate | Methyl Methacrylate | Triphenlmethyl Methacrylate |
| Example 15 | 55 | 45 | — |
| Example 16 | 50 | 45 | 5 |
| Example 17 | 10 | 45 | 45 |

EXAMPLE 18

Diphenyl(p-methoxyphenyl)methyl chloride was reacted with potassium methacrylate using the procedure of Example 1 to produce diphenyl(p-methoxyphenyl)methyl methacrylate (hereinafter abbreviated to MTMA).

50 parts MTMA, 30 parts methyl methacrylate and 20 parts butyl arylate were dissolved in xylene at a solids content of 50 percent. 2 parts 'Vazo 67' (Trade Mark) azo compound initiator was added and polymerisation was carried out at 90° C. for 5 hours followed by 30 minutes at 110° C.

The copolymer solution produced was milled with cuprous thiocyanate at a pigment volume concentration of 35 percent to produce a self-smoothing marine anti-fouling paint.

EXAMPLES 19 AND 20

MTMA prepared as described in Example 18 was copolymerised using the procedure of Example 18 with various proportions of methyl methacrylate and butyl acrylate as set out in Table 3 below. In each case the copolymer solution produced could be pigmented with cuprous thiocyanate as described in Example 18 to produce an anti-fouling paint.

TABLE 3

| | Per Cent By Weight of Each Monomer | | |
|---|---|---|---|
| | MTMA | Methyl Methacrylate | Butyl Acrylate |
| Example 19 | 60 | 20 | 20 |
| Example 20 | 70 | 10 | 20 |

EXAMPLE 21

Phenyl bis(p-methoxyphenyl)methyl chloride was reacted with potassium methacrylate using the procedure of Example 1 to produce phenyl bis(p-methoxyphenyl)methyl methacrylate (DMTMA).

50 parts DMTMA and 50 parts methyl methacrylate were copolymerised at 50 percent solids in xylene using the procedure of Example 18. The copolymer solution produced could be pigmented with cuprous thiocyanate as described in Example 18 to produce an anti-fouling paint.

We claim:

1. A self-polishing anti-fouling marine paint comprising a pigment, a biocide for marine organisms which is different from the pigment, and a film-forming polymeric binder which is hydrolysable in seawater and contains units corresponding to an ester of an olefinically unsaturated acid having the formula:

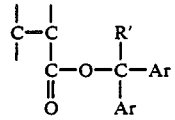

where each Ar independently is an aryl group and R' is a hydrogen atom, an alkyl group or aryl group.

2. An anti-fouling marine paint according to claim 1, wherein R' and each Ar are all independently aryl groups.

3. An anti-fouling marine paint according to claim 2, wherein said polymer contains units corresponding to triphenylmethyl acrylate or methacrylate.

4. An anti-fouling marine paint according to claim 1, wherein at least one of the groups Ar is a phenyl group substituted by one or two electron-releasing groups.

5. An anti-fouling marine paint according to claim 4, wherein said polymer contains units corresponding to diphenyl(p-methoxyphenyl)methyl acrylate or methacrylate.

6. An anti-fouling marine paint according to claim 1, said polymer contains 25–40 percent of units of said formula.

7. An anti-fouling marine paint according to claim 1, wherein said polymer also contains units of an alkyl acrylate having at least two carbon atoms in the alkyl group.

8. A paint according to claim 1, wherein said pigment comprises cuprous oxide, cuprous thiocyanate or zinc ethylene bis(dithiocarbamate).

9. An anti-fouling marine paint comprising a pigment which is a sparingly soluble copper or zinc compound having a solubility in sea water of from 0.5 to 10 parts per million by weight and acts as a biocide for marine organisms and a film-forming binder which is a hydrolysable polymer containing units corresponding to an ester of an olefinically unsaturated acid and having the formula

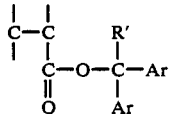

where each Ar independently is an aryl group and R' is a hydrogen atom, an alkyl group or aryl group.

10. A paint according to claim 9 wherein said pigment comprises cuprous oxide, cuprous thiocyanate or zinc ethylene bis(dithiocarbamate).

11. An anti-fouling marine paint according to claim 9, wherein R' and each Ar are all independently aryl groups.

12. An anti-fouling marine paint according to claim 11, wherein said polymer contains units corresponding to triphenylmethyl acrylate or methacrylate.

13. An anti-fouling marine paint according to claim 9, wherein at least one of the groups Ar is a phenyl group substituted by one or two electron-releasing groups.

14. An anti-fouling marine paint according to claim 13 wherein polymer contains units corresponding to diphenyl(p-methoxyphenyl)methyl acrylate or methacrylate.

15. An anti-fouling marine paint according to claim 9, wherein said polymer contains 25–40 percent of units of said formula.

16. An anti-fouling marine paint according to claim 9 wherein said polymer also contains units of an alkyl acrylate having at least two carbon atoms in the alkyl group.

17. The anti-fouling marine paint according to claim 9 wherein the pigment volume concentration is from about 35–50 percent.

18. The anti-fouling marine paint according to claim 1 wherein the pigment volume concentration is from about 30–50 percent.

19. The anti-fouling marine paint according to claim 1 wherein the pigment comprises zinc oxide.

* * * * *